July 28, 1925.  
E. ROMANELLI  
1,547,688  
APPARATUS FOR OBTAINING NITROGEN FROM AIR  
Filed Jan. 18, 1922
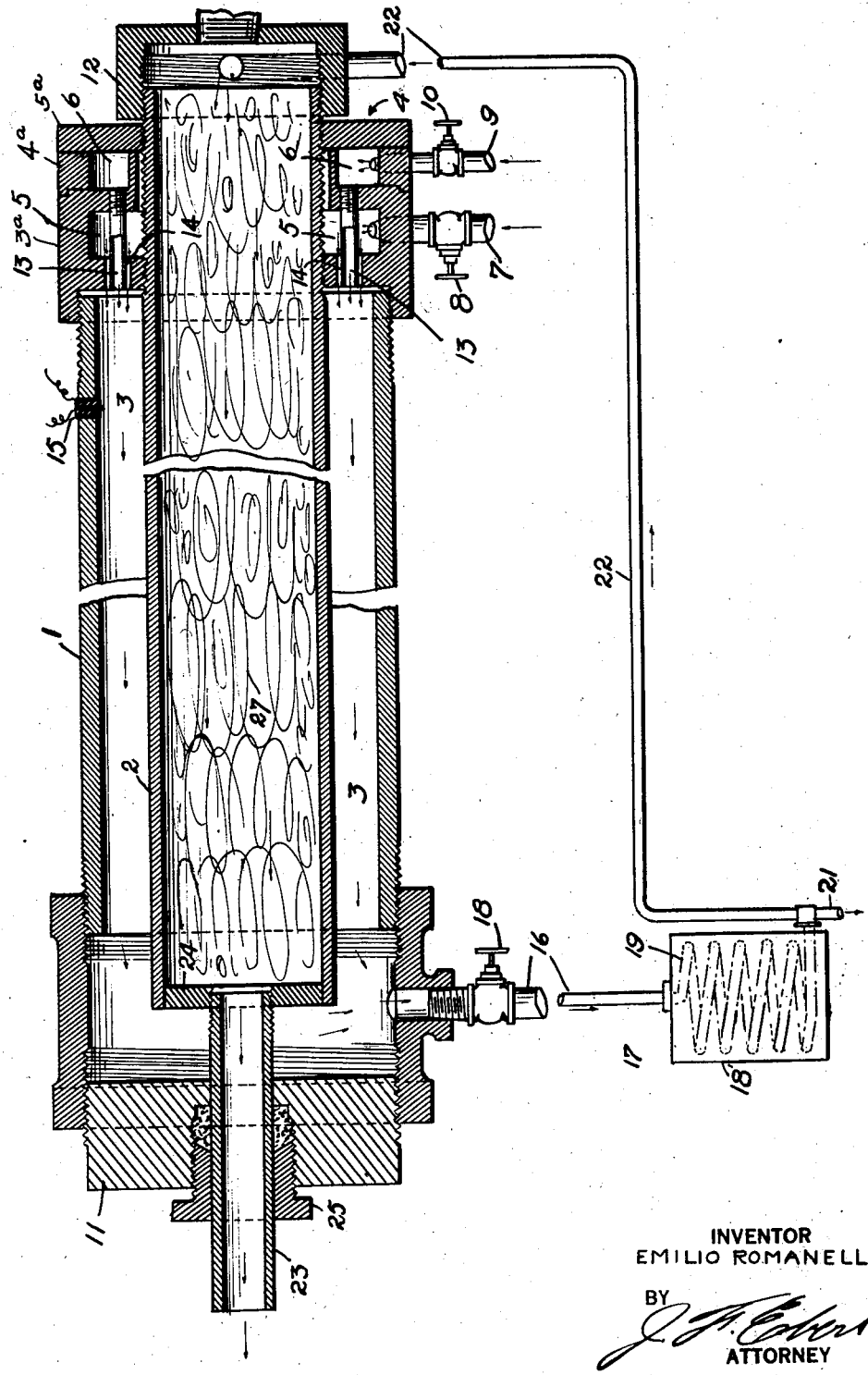
INVENTOR  
EMILIO ROMANELLI  
BY  
ATTORNEY Patented July 28, 1925.

1,547,688

UNITED STATES PATENT OFFICE.

EMILIO ROMANELLI, OF BLOOMFIELD, NEW JERSEY, ASSIGNOR TO WESTINGHOUSE LAMP COMPANY, A CORPORATION OF PENNSYLVANIA.

APPARATUS FOR OBTAINING NITROGEN FROM AIR.

Application filed January 18, 1922. Serial No. 530,179.

*To all whom it may concern:*

Be it known that I, EMILIO ROMANELLI, a citizen of the United States, and a resident of Bloomfield, in the county of Essex and State of New Jersey, have invented a new and useful Improvement in Apparatus for Obtaining Nitrogen from Air, of which the following is a specification.

This invention relates to apparatus for obtaining nitrogen from the air and more particularly to apparatus for producing nitrogen containing a small percentage of hydrogen.

One object of the invention is to provide an apparatus in which one of the steps in the process carried out by the apparatus is utilized to effect a reduction in the temperature of one of the elements of which the apparatus is constituted.

Another object is to provide an apparatus having a minimum number of parts, whereby a compact and efficient unit is produced with a view to low maintenance cost and economy of space.

In accordance with my invention, I eliminate certain elements heretofore employed in apparatus of the type which include a combustion chamber and a purification compartment and provide an equally efficient but a more economically constructed apparatus; furthermore, I utilize one element to perform two functions, namely, the purification of a gas and the dissipation of heat from the combustion chamber.

The process carried out by an apparatus of the type to which my invention is applicable is well known and consists in mixing air and an excess of hydrogen in a combustion chamber. This mixture is then ignited, producing almost complete combustion, the result being nitrogen and hydrogen containing water vapor, with a trace of oxygen. The gaseous mixture is then passed through a condenser in which the water vapor is condensed out, leaving nitrogen gas, a slight amount of hydrogen and a trace of oxygen, the amount of hydrogen depending upon the regulation of the apparatus and the introduction of the gas therein.

In an apparatus for carrying out the above outlined process it is not always practical to provide the necessary accurate regulation of the gases, so as to obtain the nitrogen, without the possibility of a slight amount of oxygen being contained therein. The gases are, therefore, finally passed in contact with any substance which will combine with and remove any oxygen that may still be combined with the nitrogen gas.

To effect this removal of oxygen or purification step, it has been found preferable to use a metal such as copper, copper wire being preferable inasmuch as it may be conveniently disposed in the purification compartment. The final purification of the nitrogen obviously requires the employment of a separate chamber or compartment. Heretofore this compartment has been so juxtaposed with respect to the other portions of the apparatus as to be conveniently connected therewith for the passage of the gas through the compartment, for purification. It is also essential to employ means for cooling the combustion chamber of the apparatus to maintain it at an operating temperature, and such cooling means have consisted of a water jacket or coil, which made a cumbersome addition to the apparatus and entailed considerable expense for up-keep.

In my invention, the purification compartment is disposed within the combustion chamber of the apparatus, with the result that a more compact structure is obtained and the water jacket or coil is eliminated, as will be hereinafter set forth.

Since the process to be carried out by the present apparatus provides a condenser through which vapor produced by the combustion of the air and hydrogen is passed, it will be appreciated that the nitrogen leaving the condenser is relatively cool and, when this gas is passed through the purifying compartment, heat will be abstracted from the combustion chamber; whereby the purifying chamber will perform the function of a cooling jacket. Thus the purification compartment is not only arranged to provide a more compact unit, but performs the double function of cooling the combustion chamber and purifying the passing gases.

The invention will be more fully understood and other advantages will be apparent by reference to the following description and the accompanying drawing, which latter illustrates somewhat diagrammatically one embodiment of my invention. It will be noted that the drawing shows a condenser and connecting pipes in operative relation to the apparatus, but drawn on a reduced scale owing to lack of space. In practice, pipes connecting the condenser with the apparatus may be of a uniform diameter and the condenser may be coupled to the apparatus or the connection may be continuous.

The apparatus comprises an outer tubular member 1 in which is disposed another tubular member 2 that is adapted to provide a compartment for the purification of the gas. These tubular members are arranged concentrically, the member 2 being sufficiently less in diameter than the member 1 to provide an annular space 3, between the two members, which constitutes a combustion chamber. One end of the tubular member 1 is provided with a head 4, which is screwed onto the member. The tubular member 2 extends through the head and is screwed therein.

The head 4 may comprise a body $3^a$ to which an annulus $4^a$ may be welded or otherwise secured and a flange member $5^a$ may be fastened by welding to the annulus $4^a$. The body $3^a$ may be provided with an air chamber 5 and a gas chamber 6. Air at a pressure slightly higher than atmospheric is admitted to the chamber 5 through a pipe 7; a suitable valve 8 being provided to regulate the flow. Hydrogen gas under pressure may be introduced into the chamber 6 through pipe 9, and a suitable throttle valve 10 is provided to govern the flow of the gas. The head 4 thus provides a closure for one end of the member 1, the opposite end being closed by a plug 11. One end of the chamber 2 is closed by a cap 12, while the opposite end of this chamber is provided with connections to be later described.

The fluids to be mixed for combustion are introduced independently to the chamber 3. The hydrogen gas may pass through a plurality of passageways 13, comprising short pieces of tubing having their ends screwed in a wall of the chamber 6 and their free ends disposed in circular apertures in a wall of the chamber 5, thus affording communication between the hydrogen chamber 6 and the combustion chamber 3. These passageways 13 may be disposed at intervals in a circle about the member 2. Air is admitted to the chamber 3 by means of annular apertures 14 that are disposed around the free ends of the tubes constituting the passageways 13, the circular aperture in which the free ends of the tubes are disposed being sufficiently greater than the outside diameter of the tubes to give the required space for the passage of air.

Any number of these passages 13 and apertures 14 may be provided, as found necessary to give a combined outlet of sufficient area.

It will be noted that the air and hydrogen gases enter the chamber 3 in such manner as to cause their efficient intermingling and thereby quickly produce a mixture for combustion. The mixed fluids may be ignited by one or more suitably positioned resistance members 15, which are made incandescent by the passage of a current. After combustion, the gases, with the water vapor, are passed from the combustion chamber through a pipe 16 into a condenser 17, a valve 18 being provided to regulate the flow. The condenser serves to condense the water vapor, the condensed vapors being drained out through a pipe 21 and a suitable trap to a hot well or to the sewer. The condenser may be of any well known construction, comprising a tank 18' containing a liquid as, for instance, water in which a coil 19 is immersed.

The gas remaining after the step of condensation is, in this process, mainly nitrogen and passes through a pipe line 22 into the purifying compartment or tubular member 2, after which it passes through a relatively small outlet pipe 23, screwed into a plug 24, which serves to separate the purification compartment from the combustion chamber. The pipe 23 extends through the plug 11 of the combustion chamber; a stuffing-box 25 being provided to prevent leakage.

After the gas passes from the purifying compartment 2, it may be conducted through suitable pipe lines for use.

The substance for removing oxygen from the nitrogen gas is indicated as consisting of coils of wire 27, although it is obvious that any other suitable material may be used.

In practice, air and hydrogen are admitted to their respective chambers 5 and 6 and into the combustion chambers through the passages 13 and 14; whereupon the fluid mixture is ignited by the incandescent member 15 and almost complete combustion takes place, resulting in a gaseous mixture consisting of nitrogen and hydrogen with a trace of oxygen and water vapor. This mixture then passes through the pipe 16 and the water vapor is condensed in the condenser 17. The condensate or water is drained through the pipe 21, and the remaining gas is nitrogen with a slight amount of hydrogen and a trace of oxygen. It is necessary, however, to further purify this gas in order to eliminate any trace of oxygen that may possibly be contained therein and, for this purpose, the gas is then passed through the purifying compartment 2, containing such material as will eliminate, by chemical combustion, any oxygen in the gas. It will be understood that the purification compartment 2 is so disposed with respect to the combustion chamber 3, that it not only absorbs heat to cool the combustion chamber, but that the heat absorbed serves to bring about the reaction between the purification material and the gas passing through the purification compartment, thus the compartment serves the double function of a cooling and purification element.

During the passage of the gases through the condenser, they have been materially cooled. Thus, when passed through the purifying element, which is contiguous to or in fact practically constitutes one wall of the combustion chamber, sufficient heat is abstracted from the combustion chamber to prevent it from becoming overheated, thus eliminating the necessity for any other cooling means as, for instance, the water jacket hereinbefore mentioned.

It will be readily understood that as more air and hydrogen are burned and, consequently, more heat produced, a corresponding increase will be effected in the amount of the cooling gases that pass through the purification compartment, so that even for a large range of operation, the temperature of the apparatus varies but very little.

Although the apparatus shown and described considers one embodiment of my invention, it is to be understood that many modifications may be made therein without departing from the scope and spirit of the appended claims.

What is claimed is:

1. An apparatus for the separation of gases comprising a combustion chamber, means for reducing the temperature of gas previously ignited in said chamber and means for utilizing said relatively cooled gas to dissipate heat from said chamber.

2. An apparatus for the separation of gases comprising a combustion chamber and means adjacent said chamber for purifying a relatively cool gas, said gas operating as a cooling medium for said chamber during the process of purification.

3. An apparatus for the separation of gases comprising an outer chamber and an inner chamber, means for introducing a gaseous mixture into said outer chamber for combustion, means for condensing at least a part of the mixture resulting from combustion, means for removing the condensate and means for passing the remaining gas through said inner chamber.

4. An apparatus for the separation of gases comprising a combustion chamber and means for igniting a gaseous mixture therein, means for condensing and thereby cooling a portion of said gas after ignition, and means for utilizing said cooled gas to absorb heat from said combustion chamber.

5. An apparatus for the separation of gases comprising a combustion chamber and means for igniting a mixture of hydrogen and air therein, means for condensing a portion of the product and thereby cooling said gas after ignition, and means for utilizing said cooled gas to absorb heat from said combustion chamber.

6. An apparatus for the separation of gases comprising a combustion chamber, means for reducing the temperature of gas after combustion, and means for passing said gas adjacent said combustion chamber to cool said chamber.

7. An apparatus for the separation of gases comprising a combustion chamber, means for introducing air and hydrogen into said chamber for combustion, means for condensing at least one of the constituents of the mixture resulting from combustion, means for removing the resultant condensate, means for passing the remaining gas adjacent said combustion chamber for the purpose of abstracting heat therefrom, means for purifying said gas during said passage, and means for simultaneously purifying said gas.

8. An apparatus for the separation of gases comprising two elements relatively positioned so as to provide an inner compartment and an outer chamber, means for introducing mixture of gases into said chamber, means for igniting said mixture, means for reducing the temperature of the gas after combustion, gas-purifying means within said compartment, and means for passing said cooled gas through said compartment, whereby the gas may be purified and a reduction in the temperature of said chamber be effected.

9. An apparatus for the separation of gases comprising a combustion chamber, means for introducing air and hydrogen to produce a gaseous mixture in said chamber, means for igniting said mixture, means for cooling the mixture resulting from combustion to extract at least one of the constituents therefrom and means for purifying the remainder of said cooled gas, said purifying means being so disposed with relation to said combustion chamber that the relatively cool gases absorb heat from said chamber during the purification process.

10. An apparatus for the separation of gases comprising a combustion element, means for igniting a gaseous mixture, means for cooling at least one of the constituents of the mixture resulting from combustion, and means for purifying said cooled constituent, said last-mentioned means being so positioned with respect to said chamber that the cooled gas abstracts heat from said chamber during the process of purification.

11. An apparatus for the separation of gases comprising a combustion chamber, a gas-purifying compartment disposed within said chamber, means for introducing air and hydrogen into said chamber to produce a gaseous mixture, means for igniting said mixture, a condenser, means for conducting the gaseous mixture resulting from combustion through said condenser to remove at least one of the constituents of the resultant mixture and means for passing the remaining gas through said compartment for purification and to effect a reduction in the temperature of said chamber.

12. An apparatus for the separation of gases comprising an outer tubular member, an inner tubular member, said members being so disposed as to provide a combustion chamber therebetween, a head disposed at one end of said combustion chamber having a hydrogen gas receiving chamber and an air receiving chamber, a closure for the opposite end of said outer tubular member, hollow tubular members for the passage of hydrogen to said combustion chamber and independent communication between said air chamber and said combustion chamber.

In testimony whereof, I have hereunto subscribed my name this 17th day of January, 1922.

EMILIO ROMANELLI.